United States Patent
Tang

(10) Patent No.: US 10,429,407 B2
(45) Date of Patent: Oct. 1, 2019

(54) THREE-AXIS INERTIAL SENSOR FOR DETECTING LINEAR ACCELERATION FORCES

(71) Applicant: NXP USA, INC., Austin, TX (US)

(72) Inventor: Jun Tang, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 270 days.

(21) Appl. No.: 15/469,754

(22) Filed: Mar. 27, 2017

(65) Prior Publication Data

US 2018/0275161 A1   Sep. 27, 2018

(51) Int. Cl.
*G01P 15/12* (2006.01)
*G01P 15/125* (2006.01)
*G01P 15/18* (2013.01)
*G01P 15/08* (2006.01)

(52) U.S. Cl.
CPC ............ *G01P 15/125* (2013.01); *G01P 15/18* (2013.01); *G01P 2015/082* (2013.01); *G01P 2015/0805* (2013.01); *G01P 2015/0837* (2013.01)

(58) Field of Classification Search
CPC .................. G01P 15/125; G01P 15/15; G01P 2015/0837; G01P 2015/082; G01P 2015/0805
USPC ...................................................... 73/514.32
See application file for complete search history.

(56) References Cited

U.S. PATENT DOCUMENTS

| | | | |
|---|---|---|---|
| 7,258,011 B2 | 8/2007 | Nasiri et al. | |
| 8,047,075 B2 | 11/2011 | Nasiri et al. | |
| 8,372,677 B2 | 2/2013 | Mehregany | |
| 8,555,719 B2 | 10/2013 | McNeil et al. | |
| 8,739,626 B2 | 6/2014 | Acar | |
| 8,973,439 B1 | 3/2015 | Baldasarre et al. | |
| 8,978,475 B2 | 3/2015 | Acar | |
| 2003/0230143 A1* | 12/2003 | Mahon | G01P 15/0802 73/514.29 |
| 2010/0071467 A1* | 3/2010 | Nasiri | G01C 19/5719 73/504.12 |
| 2016/0214853 A1 | 7/2016 | Thompson et al. | |
| 2016/0334215 A1* | 11/2016 | Kato | G01C 19/5719 |

(Continued)

FOREIGN PATENT DOCUMENTS

EP    2315039 A1    4/2011
EP    2887073 A1    6/2015

(Continued)

OTHER PUBLICATIONS

U.S. Appl. No. 15/845,506, filed Dec. 18, 2017; 21 pages.

(Continued)

*Primary Examiner* — Tarun Sinha

(74) *Attorney, Agent, or Firm* — Charlene R. Jacobsen

(57) ABSTRACT

An inertial sensor includes a proof mass spaced apart from a surface of a substrate. The proof mass has a first section and a second section, where the first section has a first mass that is greater than a second mass of the second section. An anchor is coupled to the surface of the substrate and a spring system is interconnected between the anchor and the first and second sections of the proof mass. The spring system enables translational motion of the first and second sections of the proof mass in response to linear acceleration forces imposed on the inertial sensor in any of three orthogonal directions.

20 Claims, 4 Drawing Sheets

(56) References Cited

U.S. PATENT DOCUMENTS

2017/0023608 A1* 1/2017 Tang .................... G01P 15/125

FOREIGN PATENT DOCUMENTS

EP           3121605 A1    1/2017
WO    WO-2013/116356 A1   8/2013

OTHER PUBLICATIONS

Qu, Hongwei, et al; "A Monolithic CMOS-MEMS 3-Axis Accelerometer With a Low-Noise, Low-Power Dual-Chopper Amplifier"; IEEE Sensors Journal, vol. 8, No. 9; pp. 1511-1518 (Sep. 2008).

* cited by examiner

THREE-AXIS INERTIAL SENSOR FOR DETECTING LINEAR ACCELERATION FORCES

TECHNICAL FIELD OF THE INVENTION

The present invention relates generally to inertial sensor devices. More specifically, the present invention relates to a three-axis microelectromechanical systems (MEMS) inertial sensor device for detecting linear acceleration forces in any of three orthogonal axes.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. MEMS sensors are widely used in applications such as automotive, inertial guidance systems, household appliances, game devices, protection systems for a variety of devices, and many other industrial, scientific, and engineering systems.

One example of a MEMS sensor is a MEMS accelerometer. MEMS accelerometers are sensitive to acceleration and may be configured to sense acceleration forces along one, two, or three axes or directions. One common form of MEMS accelerometer uses one or more movable structures that move under acceleration above a substrate. The movement of the movable structure changes capacitance, and an electrical circuit connected to the MEMS accelerometer structure measures the change in capacitance to determine the acceleration forces.

Continuous effort is being directed toward reducing the die size and commensurately, the cost of such MEMS accelerometers. A design approach to reducing die size is the implementation of a single proof mass design capable of detecting acceleration forces along multiple orthogonal axes. However, significant challenges arise in meeting predetermined sensitivity and reliability requirements with the implementation of a single proof mass, multiple axis sensing approach.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns microelectromechanical systems (MEMS) inertial sensors with small form factors and enhanced sensitivity and/or reliability. More particularly, embodiments entail MEMS accelerometer devices capable of sensing acceleration forces in three orthogonal directions (e.g., X-axis, Y-axis, and Z-axis). In general, the embodiments described herein can provide relatively small device size by facilitating the sharing of a single proof mass structure for sensing in all three directions. Furthermore, the embodiments can provide this relatively small device size while providing differential sensing with enhanced sensing efficiency. The enhanced sensing efficiency can be provided by the use of a spring structure that enables translational motion of the proof mass in response to acceleration in each of the three orthogonal directions. Further, a translational motion based approach as opposed to prior art rotational or teeter-totter motion based approaches can yield improvements in device performance such as optimization of sense electrode locations for package stress at various temperatures, and enhancing restoring force to substantially limit stiction related malfunctions.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching may be utilized in the illustrations, the different elements within the structural layers may be formed out of the same material.

Figure 1:
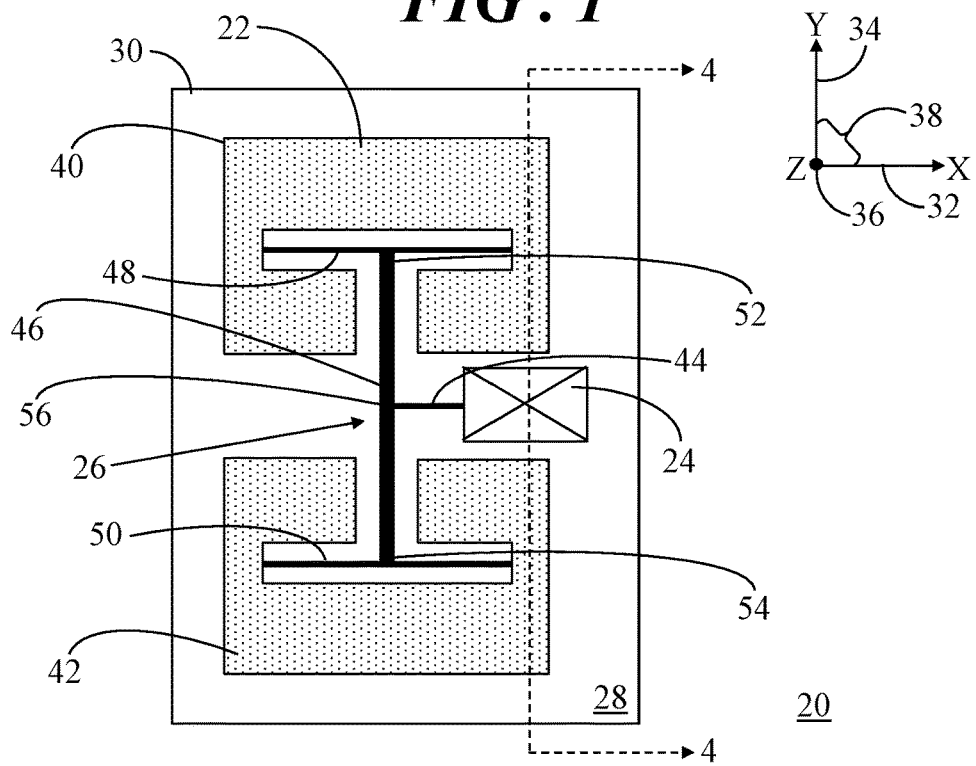
FIG. 1 shows in a simplified and representative form a schematic top view of a microelectromechanical systems (MEMS) inertial sensor in an example embodiment.

Referring to FIG. 1, FIG. 1 shows, in a simplified and representative form, a schematic top view of a microelectromechanical systems (MEMS) inertial sensor 20 in an example embodiment. MEMS inertial sensor 20 generally includes a movable element, referred to herein as a proof mass 22, an anchor 24, and a spring system 26 interconnected between proof mass 22 and anchor 24. Anchor 24 and spring system 26 are configured to movably couple proof mass 22 to a planar surface 28 of a substrate 30.

In the top view illustration of FIG. 1, a three-dimensional coordinate system is represented in which an X-axis 32 is directed rightward and leftward on the page, a Y-axis 34 is directed upward and downward on the page, and a Z-axis 36 is directed into the page. Together, X-axis 32 and Y-axis 34 define an X-Y plane 38, and surface 28 of substrate 30 is generally parallel to X-Y plane 38.

Proof mass 22 has a first section 40 and a second section 42. First section 40 has a first mass that is greater than a second mass of second section. This can be accomplished, in some embodiments by providing a greater density of etch holes extending through second section 42 than the density of etch holes extending through first section 40. A greater density of etch holes extending through second section 42 reduces its mass relative to first section 40. For clarity, first section 40 will be referred to herein as heavy section 40 and second section 42 will be referred to herein as light section 42. Further, proof mass 22 (including heavy and light sections 40, 42) is depicted with a light stippled pattern to distinguish it from other features of inertial sensor 20.

Spring system 26 includes a first spring element 44, a rotational beam 46, a second spring element 48, and a third spring element 50. Rotational beam 46 has a first beam end 52 and a second beam end 54. First spring element 44 interconnects anchor 24 and a midpoint 56 of rotational beam 46, where midpoint 56 is centered between first and second beam ends 52, 54. Second spring element 48 interconnects first beam end 52 of rotational beam 46 and heavy section 40 of proof mass 22. Similarly, third spring element 50 interconnects second beam end 54 of rotational beam 46 and light section 42 of proof mass 22. First, second, and third spring elements 44, 48, 50 are oriented substantially parallel to one another and rotational beam 46 is oriented substantially perpendicular to first, second, and third spring elements 44, 48, 50. However, spring system 26 including first, second, and third spring elements 44, 48, 50 and rotational beam 46 are all oriented in X-Y plane 38 substantially parallel to planar surface 28.

As will be discussed in significantly greater detail below, the configuration of spring system 26 enables translational motion of proof mass 22 in response to acceleration forces imposed on inertial sensor 20 in any of three orthogonal directions. The motion includes translational motion in a first direction, referred to herein as an X-direction 58 (FIG. 2) parallel to X-axis 32, translational motion in a second direction, referred to herein as a Y-direction 60 (FIG. 3) parallel to Y-axis, and translational motion in a third direction, referred to herein as a Z-direction 62 (see FIG. 4) parallel to Z-axis 36. Thus, proof mass 22 is capable of translational motion substantially parallel to any of X-axis 32, Y-axis 34, and Z-axis 36.

The translational motion in response to linear acceleration forces imposed on inertial sensor 20 can be detected as a change in capacitance between certain electrodes. The electrodes for detecting linear acceleration forces parallel to X-axis 32 and Y-axis 34 are not shown in FIGS. 1-4 to so as to more clearly demonstrate the translational motion of proof mass 22 in response to linear acceleration forces. However, an example implementation of an inertial sensor having a plurality of electrodes will be discussed in connection with FIG. 5.

Figure 2:
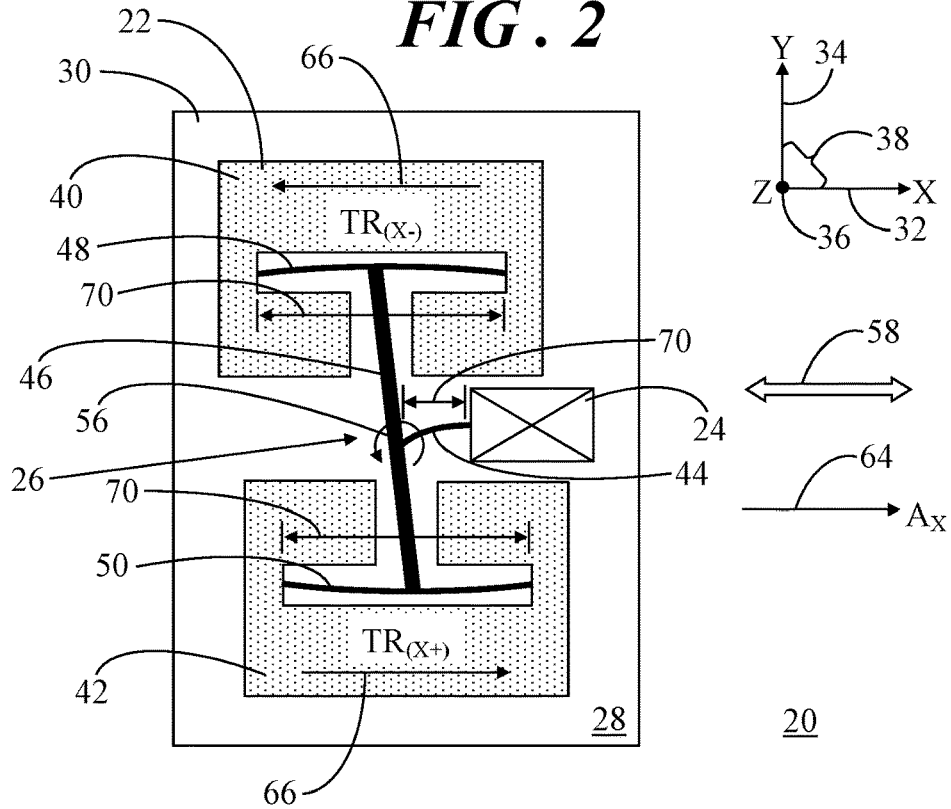
FIG. 2 shows a top view of the MEMS inertial sensor of FIG. 1 being subjected to an acceleration force in a first direction.

Referring now to FIG. 2, FIG. 2 shows a top view of MEMS inertial sensor 20 being subjected to a linear acceleration force 64, labeled $A_X$, in a first direction, e.g., X-direction 58. In this illustration, acceleration force 64 causes translational motion of heavy and light sections 40, 42 in X-direction 58. However, heavy and light sections 40, 42 move in anti-phase (i.e., opposite directions) relative to one another as denoted by arrows 66, 68, labeled $TR_{(X-)}$ and $TR_{(X+)}$, respectively. In this example, acceleration force 64 is in a positive direction relative to X-axis 32. Thus, heavy section 40 will undergo translational motion 66 in the opposite direction of acceleration force 64 and light section 42 will undergo translational motion 68 in the same direction as acceleration force 64.

Translational motion 66, 68 of heavy and light sections 40, 42 of proof mass 22 is enabled by spring system 26. That is, X-direction 58 of acceleration force 64 is substantially parallel to a lengthwise dimension 70 of first, second, and third spring elements 44, 48, 50 and therefore perpendicular to rotational beam 46. Rotational beam 46 is relatively rigid, and first, second, and third spring elements 44, 48, 50 are flexible relative to rotational beam 46. Accordingly, in response to acceleration force 64, rotational beam 46 pivots about its midpoint 56 and first, second, and third spring elements 44, 48, 50 flex to yield the anti-phase translational motion 66, 68 of heavy and light sections 40, 42 of proof mass 22. The degree of translational motion 66, 68 is primarily determined by the stiffness of the combination of first, second, and third spring elements 44, 48, 50.

Figure 3:
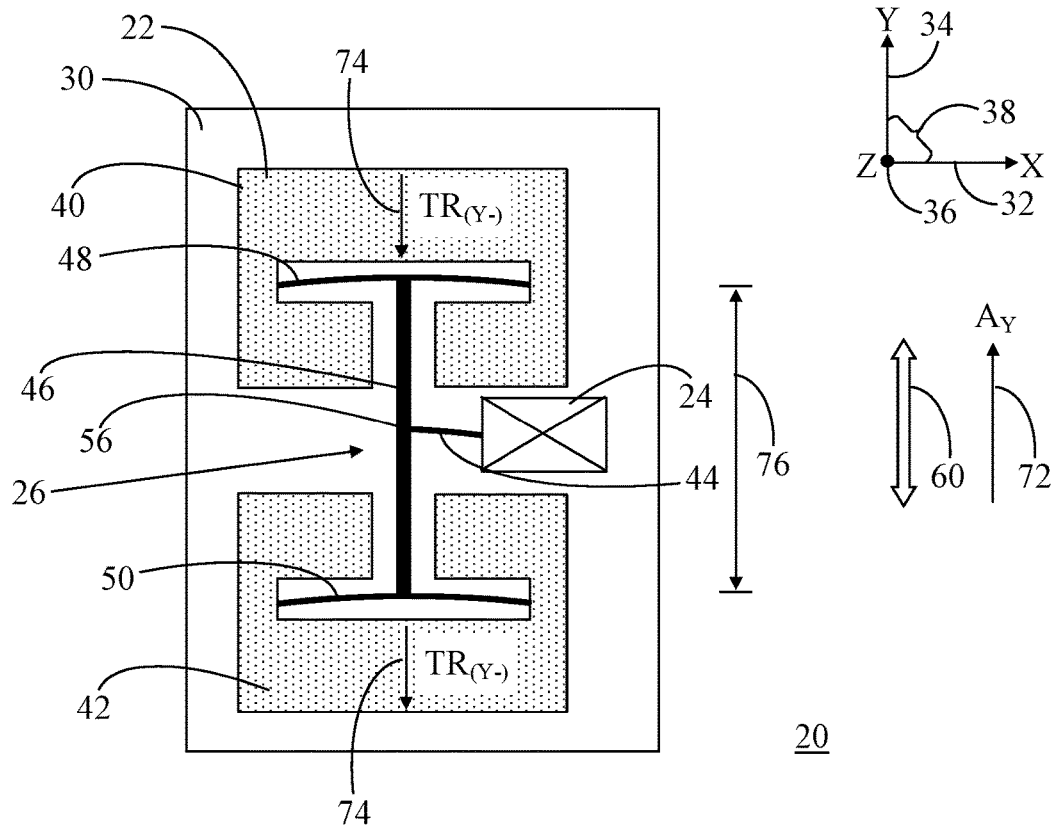
FIG. 3 shows a top view of the MEMS inertial sensor of FIG. 1 being subjected to an acceleration force in a second direction.

FIG. 3 shows a top view of MEMS inertial sensor 20 being subjected to a linear acceleration force 72, labeled $A_Y$, in a second direction, e.g., Y-direction 60. In this illustration, acceleration force 72 causes translational motion of heavy and light sections 40, 42 in Y-direction 60. However, heavy and light sections 40, 42 move in-phase (i.e., in the same direction) relative to one another as denoted by arrows 74, labeled $TR_{(Y-)}$. In this example, acceleration force 72 is in a positive direction relative to Y-axis 34. Thus, both of heavy and light sections 40, 42 will undergo in-phase translational motion 74 in the opposite direction of acceleration force 72.

Translational motion 74 of heavy and light sections 40, 42 of proof mass 22 is again enabled by spring system 26. That is, Y-direction 60 of acceleration force 72 is substantially parallel to a lengthwise dimension 76 of the relatively rigid rotational beam 46. Accordingly, in response to acceleration force 72, rotational beam 46 refrains from pivoting about its midpoint 56 and second and third spring elements 48, 50 primarily flex to yield the in-phase translational motion 74 of heavy and light sections 40, 42 of proof mass 22. The degree of translational motion 74 is primarily determined by the stiffness of second and third spring elements 48, 50.

Figure 4:
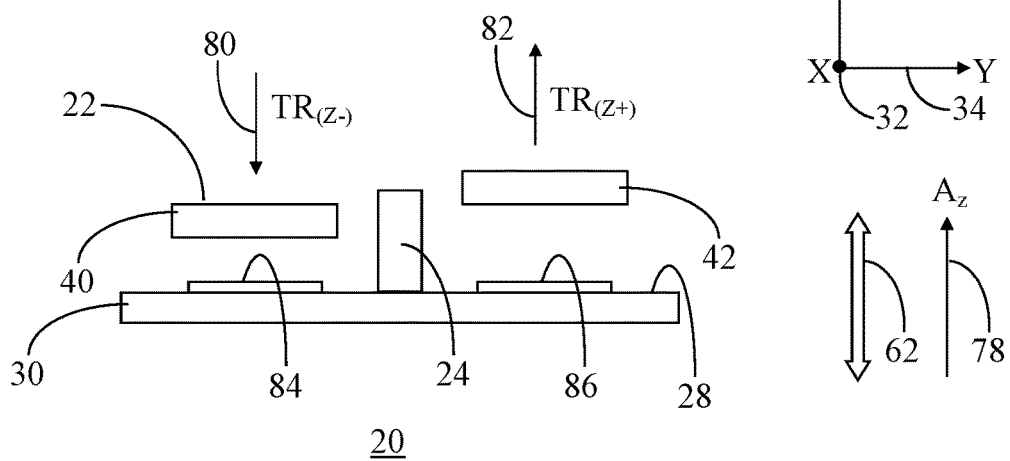
FIG. 4 shows a side view of inertial sensor 20 taken along section lines 4-4 of FIG. 1.

FIG. 4 shows a side view of inertial sensor 20 taken along section lines 4-4 of FIG. 1. In FIG. 4, inertial sensor 20 is being subjected to a linear acceleration force 78, labeled $A_Z$, in a third direction, e.g., Z-direction 62. In this illustration, acceleration force 78 causes translational motion of heavy and light sections 40, 42 of proof mass 22 in Z-direction 62. However, heavy and light sections 40, 42 move in anti-phase (i.e., opposite directions) relative to one another as denoted by arrows 80, 82, labeled $TR_{(Z-)}$ and $TR_{(Z+)}$, respectively. In this example, acceleration force 78 is in a positive direction relative to Z-axis 36. Thus, heavy section 40 will undergo translational motion 80 in the opposite direction of acceleration force 72 and light section 42 will undergo translational motion 82 in the same direction as acceleration force 72. Accordingly, a gap width changes between heavy and light sections 40, 42 and corresponding underlying sense electrodes 84, 86 formed on planar surface 28 of substrate 30 in response to anti-phase translational motion 80, 82.

Translational motion 80, 82 of heavy and light sections 40, 42 of proof mass 22 is again enabled by spring system 26. That is, in response to acceleration force 72, rotational beam 46 refrains from pivoting about its midpoint 56.

However, second and third spring elements 48, 50 flex to yield the anti-phase translational motion 80, 82 of heavy and light sections 40, 42 of proof mass 22. The degree of translational motion 80, 82 is primarily determined by the stiffness of the combination of first, second, and third spring elements 44, 48, 50.

The particular configuration of spring system 26 enables purely translational motion of first and second sections 40, 42 of proof mass 22, while the rotational/pivoting motion largely occurs in first, second, and third spring elements 44, 48, 50 and rotational beam 46. The pure translational motion based sensing approach yields a more uniform displacement of proof mass 22, relative to prior art rotational based sensing approaches. A uniform displacement of proof mass 22 can yield greater sensing efficiency since a greater area of the proof mass 22 can be utilized for and with sense electrodes. Additionally, the uniform displacement of proof mass 22 enables greater design choices for the placement of sense electrodes so that sense electrode locations may be optimized for package stress at various temperatures.

Still further, a drawback of a prior art rotational based sensing approach is that it may provide a lower restoring force compared to that of the translational based sensing approach described herein. A restoring force represents the magnitude of force that pulls back the proof mass when it contacts a substrate. The restoring force can be determined by multiplying the travel distance and the spring constant. In a teeter totter accelerometer configuration, the sensing portion of the proof mass above the sense electrodes undergoes a relatively small displacement, i.e., travel distance, until the heavy end touches the underlying substrate. For the translational motion based sensing approach, the entire proof mass remains substantially parallel to planar surface 28 of substrate 30. That is, the travel distance is equivalent to the gap width over a large surface area of the proof mass. When considering a similar spring constant for a similar sensitivity, a rotational based sensing approach provides a lower restoring force then the translational motion based sensing approach because the travel distance for the heavy end is smaller than the gap width, i.e., the travel distance of a proof mass subject to pure translational motion. A lower restoring force increases the possibility of the proof mass sticking to the substrate (i.e., stiction). Thus, the relatively greater restoring force of the pure translational motion sensing approach may decrease the potential for stiction.

Figure 5:
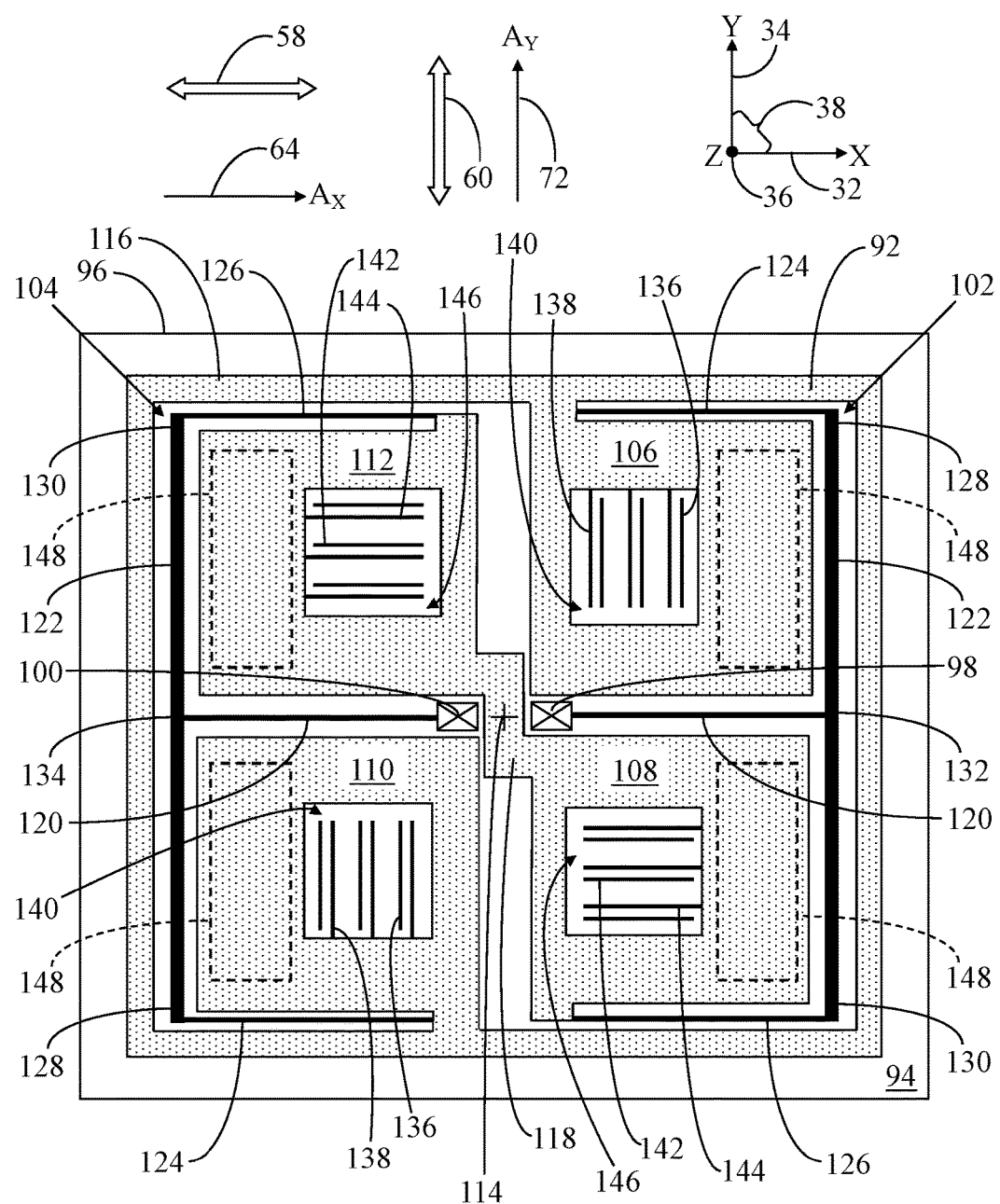
FIG. 5 shows a top view of a MEMS inertial sensor in accordance with an example implementation.

Now referring to FIG. 5, FIG. 5 shows a top view of a MEMS inertial sensor 90 in accordance with an example implementation. MEMS inertial sensor 90 generally includes a proof mass 92 spaced apart from a planar surface 94 of a substrate 96, a first anchor 98 coupled to planar surface 94, and a second anchor 100 coupled to planar surface 94. Inertial sensor 90 further includes a first spring system 102 and a second spring system 104.

In accordance with this example implementation, proof mass 92 has a first section 106, a second section 108, a third section 110, and a fourth section 112. First, second, third, and fourth sections 106, 108, 110, 112 are positioned to surround a center point 114 of proof mass 92 such that third section 110 diagonally opposes first section 106 relative to center point 114, and fourth section 112 diagonally opposes second section 108 relative to center point 114.

A frame member 116, spaced apart from planar surface 94 of substrate 96, surrounds proof mass 92. First and third sections 106, 110 are directly attached to frame member 116, and second and fourth sections 108, 112 are detached from frame member 116. However, a rigid beam 118 (that is also spaced apart from planar surface 94 of substrate 96) interconnects second and fourth sections 108, 112. Proof mass 92 (including first, second, third, and fourth sections 106, 108, 110, 112), frame member 116, and rigid beam 118, are all depicted with a light stippled pattern to distinguish them from other features of inertial sensor 20 and to more clearly illustrate the interconnection of certain features.

First spring system 102 is interconnected between first anchor 98 and first and second sections 106, 108 of proof mass 92. Similarly, second spring system 104 is interconnected between second anchor 100 and third and fourth sections 110, 112 of proof mass 92. Each of first and second spring systems 102, 104 includes a first spring element 120, a rotational beam 122, a second spring element 124, and a third spring element 126. Rotational beam 122 has a first beam end 128 end and a second beam end 130. First spring element 120 of first spring system 102 interconnects first anchor 98 and a midpoint 132 of its rotational beam 122. Likewise, first spring element 120 of second spring system 104 interconnects second anchor 100 and a midpoint 134 of its rotational beam 122. Each of midpoints 132, 134 is centered between first and second beam ends 128, 130 of its corresponding rotational beam 122.

Second spring element 124 of first spring system 102 interconnects first beam end 128 of rotational beam 122 and first section 106 of proof mass 92. Third spring element 126 of first spring system 102 interconnects second beam end 130 of rotational beam 46 and second section 108 of proof mass 92. Similarly, second spring element 124 of second spring system 104 interconnects first beam end 128 of rotational beam 122 and third section 110 of proof mass 92. Third spring element 126 of second spring system 102 interconnects second beam end 130 of rotational beam 122 and the fourth section 112 of proof mass 92.

Additionally, first, second, and third spring elements 120, 124, 126 of each of first and second spring systems 102, 104 are oriented substantially parallel to one another and rotational beam 122 is oriented substantially perpendicular to first, second, and third spring elements 120, 124, 126. However, first, second, and third spring elements 120, 124, 126 and rotational beam 122 of first and second spring systems 102, 104 are all oriented in X-Y plane 38 substantially parallel to planar surface 94.

Like inertial sensor 20 (FIG. 1), the configuration of first and second spring systems 102, 104 enables translational motion of proof mass 92 in response to linear acceleration forces imposed on inertial sensor 90 in any of three orthogonal directions. The motion includes translational motion in the first direction, e.g., X-direction 58 parallel to X-axis 32, translational motion in the second direction, e.g., Y-direction 60 parallel to Y-axis, and translational motion in the third direction, e.g., Z-direction 62 (best seen in FIG. 4) parallel to Z-axis 36. Thus, proof mass 92 is capable of translational motion substantially parallel to any of X-axis 32, Y-axis 34, and Z-axis 36.

The translational motion in response to linear acceleration forces imposed on inertial sensor 90 can be detected as a change in capacitance between certain electrodes. Thus, inertial sensor 90 includes first fixed electrodes 136 coupled to substrate 96 proximate each of first and third sections 106, 110 of proof mass 92. First movable electrodes 138 are coupled to each of said first and third sections 106, 110 of proof mass 92 and are positioned in alternating arrangement with first fixed electrodes 136. First fixed and movable electrodes 136, 138 may be disposed in openings 140 extending through each of first and third sections 106, 110. First fixed and movable electrodes 136, 138 are used to detect linear acceleration force 64 (FIG. 2) in X-direction 58 as a change in capacitance between fixed and movable electrodes 136, 138.

Inertial sensor 90 further includes second fixed electrodes 142 coupled to substrate 96 proximate each of second and fourth sections 108, 112 of proof mass 92. Second movable electrodes 144 are coupled to each of second and fourth sections 108, 112 of proof mass 92 and are positioned in alternating arrangement with second fixed electrodes 142. Second fixed and movable electrodes 142, 144 may be disposed in openings 146 extending through each of second and fourth sections 108, 112. Second fixed and movable electrodes 142, 144 are used to detect linear acceleration force 72 in Y-direction 60 as a change in capacitance between fixed and movable electrodes 142, 144.

Still further, inertial sensor 90 includes third fixed electrodes 148 formed on surface 94 of substrate 96. Third fixed electrodes 148 are positioned underlying each of first, second, third, and fourth sections 106, 108, 110, 112 of proof mass 92. In the top view of FIG. 5, third fixed electrodes 148 are obscured by proof mass 92. Thus, third fixed electrodes 148 are shown in dashed line form. Third fixed electrodes 148 are used to detect linear acceleration force 78 (FIG. 4) in Z-direction 62 (FIG. 4) as a change in capacitance between third fixed electrodes 148 and proof mass 92.

Proof mass 92, including first, second, third, and fourth sections 106, 108, 110, 112 is represented in greatly simplified form. It should be understood, however, that proof mass 92 can encompass a great variety of shapes and configurations, and may include less than or greater than the four sections shown. Further, only a few fixed and movable electrodes are shown for simplicity of illustration. Those skilled in the art will recognize that the quantity and/or configuration of the fixed and movable electrodes can vary in accordance with a particular design to, for example, optimize their location and sensitivity to linear acceleration forces 64, 72, and 78.

Figure 6:
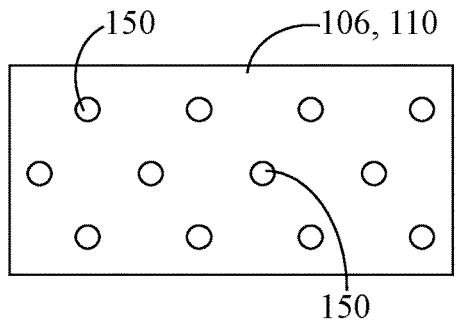
FIG. 6 shows a top view of a section of a proof mass of the MEMS inertial sensor of FIG. 5.
Figure 7:
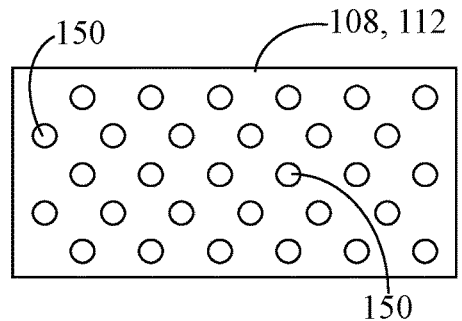
FIG. 7 shows a top view of another section of a proof mass of the MEMS inertial sensor of FIG. 5.

Referring to FIGS. 6 and 7, FIG. 6 shows a top view of a section of proof mass 92 of MEMS inertial sensor 90 (FIG. 5) and FIG. 7 shows a top view of another section of proof mass 92 of MEMS inertial sensor 90. In this example, each of first and third sections 106, 110 of proof mass 92 has a first mass that is greater than a second mass of each of second and fourth sections 108, 112 of proof mass. Thus, FIG. 6 represents a portion of either of first and third sections 106, 110 and FIG. 7 represents a portion of either of second and fourth sections 108, 112.

In order to achieve the greater mass of first and third sections 106, 110 as compared to second and fourth sections 108, 112, first and third sections 106, 110 may be fabricated with relatively fewer etch holes 150 than second and fourth sections 108, 112. The lower density of etch holes 150 extending through first and third sections 106, 110 relative to the higher density of etch holes 150 extending through second and fourth sections 108, 110 results in first and third sections 106, 110 having a greater mass than second and fourth sections 108, 112.

Figure 8:
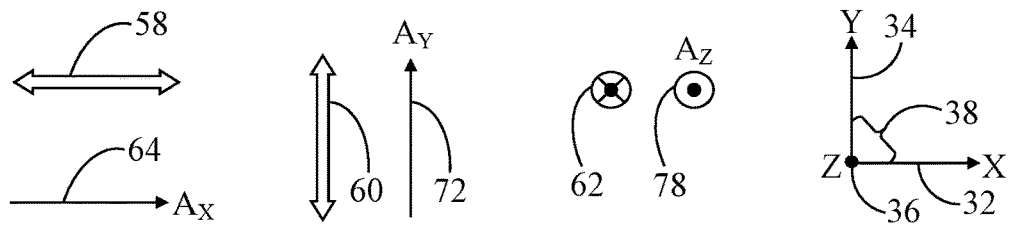
FIG. 8 shows a top view of a MEMS inertial sensor in accordance with another example implementation.
Figure 8:
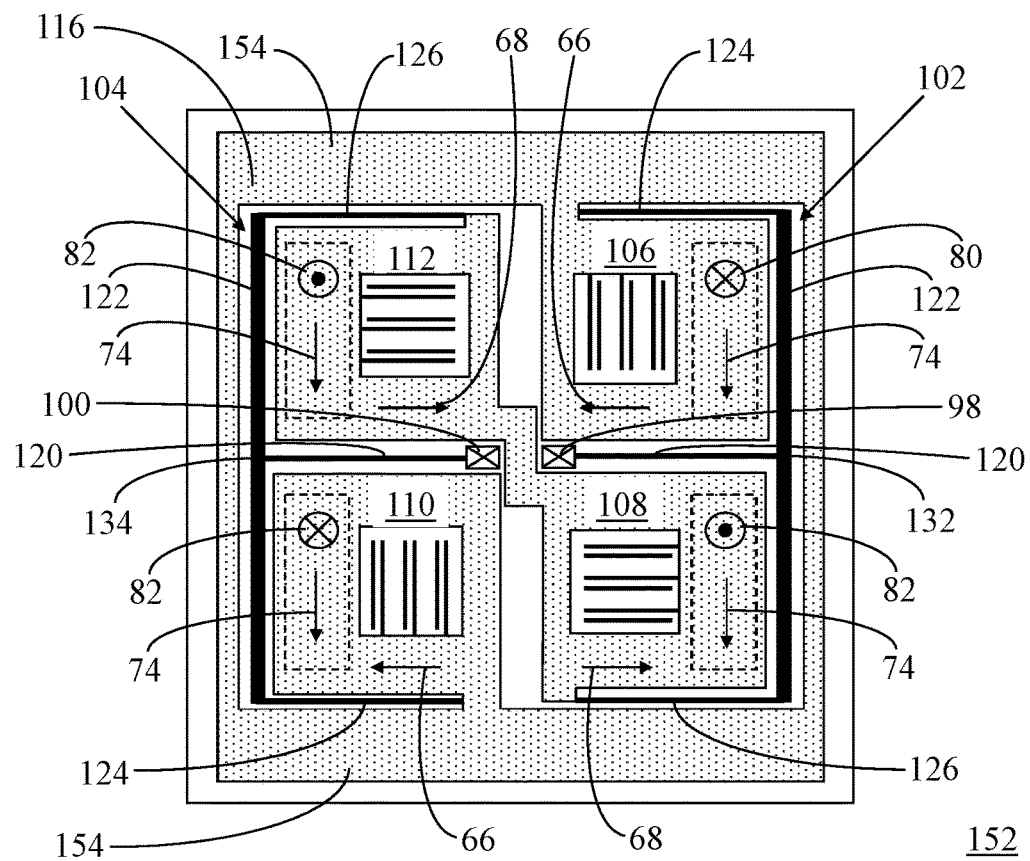

FIG. 8 shows a top view of inertial sensor 152 in accordance with another example implementation. Inertial sensor 152 includes all of the elements of inertial sensor 90 (FIG. 5) including proof mass 92, with first, second, third, and fourth sections 106, 108, 110, 112, first and second anchors 98, 100, first and second spring systems 102, 104, and frame member 116 surrounding proof mass 92. Another technique that may be implemented to achieve the greater mass of first and third sections 106, 110 of proof mass 92 is to use a relatively larger frame that connects first and third sections 106, 110. In this example, frame member 116 includes end sections 154 that may increase the relative mass of first and third sections 106, 110 over second and fourth sections 108, 112.

Two examples for creating a system in which first and third sections 106, 110 of proof mass 92 have greater mass than second and fourth sections 108, 112 have been described herein. Those skilled in the art will recognize that other techniques may be implemented to yield the greater mass of first and third sections 106, 110 relative to second and fourth sections 108, 112. The mass difference between first and third sections 106, 110 and second and fourth sections 108, 112 is critical for achieving the anti-phase sensing along the X-axis 32 and Z-axis 36.

With continued reference to FIG. 8, the translational motion of first, second, third, and fourth sections 106, 108, 110, 112 of proof mass 92 in response to linear acceleration forces in any of three orthogonal directions will now be described. Of course, the ensuing discussion applies equivalently to both of inertial sensors 90 (FIG. 5) and 152 (FIG. 8).

When MEMS inertial sensor 152 is subjected to acceleration force 64, labeled $A_x$, in X-direction 58, acceleration force 64 causes translational motion of first, second, third, and fourth sections 106, 108, 110, 112 in X-direction 58. However, the heavier first and third sections 106, 110 move in anti-phase relative to the lighter second and fourth sections 108, 112. The anti-phase translational motion is again denoted by arrows 66, 68.

More particularly, in response to acceleration force 64, rotational beam 122 of each of first and second spring systems 102, 104 pivots about its associated midpoint 132, 134 and first, second, and third spring elements 120, 124, 126 flex to yield the anti-phase translational motion 66, 68 of first and third sections 106, 110 relative to second and fourth sections 108, 112 of proof mass 92. In this example, acceleration force 64 is in a positive direction relative to X-axis 32. Thus, the heavier first and third sections 106, 110 will undergo translational motion 66 in the opposite direction of acceleration force 64 and the lighter second and fourth sections 108, 112 undergo translational motion 68 in the same direction as acceleration force 64.

When MEMS inertial sensor 152 is subjected to acceleration force 72, labeled $A_y$, in Y-direction 60, acceleration force 72 causes translational motion of first, second, third, and fourth sections 106, 108, 110, 112 in Y-direction 60. However, all of first, second, third, and fourth sections 106, 108, 110, 112 move in-phase (i.e., in the same direction) relative to one another as again denoted by arrows 74. More particularly, in response to acceleration force 72, the relatively stiff rotational beam 122 of each of first and second spring systems 102, 104 refrains from pivoting about its corresponding midpoint 132, 134 and second and third spring elements 124, 126 primarily flex to yield the in-phase translational motion 74 of first, second, third, and fourth sections 106, 108, 110, 112 of proof mass 92. In this example, acceleration force 72 is in a positive direction relative to Y-axis 34. Thus, all of first, second, third, and fourth sections 106, 108, 110, 112 will undergo in-phase translational motion 74 in the opposite direction of acceleration force 72.

Now regarding the linear acceleration force parallel to Z-axis 36, Z-axis 36 is oriented into and out of the page upon which the top view of MEMS inertial sensor 152 is illustrated. The Z-direction 62 is thus represented in FIG. 8 by a dot overlaid by an "X" and surrounded by a circle to denote Z-direction 62 (first discussed in connection with FIG. 4) as being oriented into and out of the page. Similarly, acceleration force 78, labeled $A_Z$, in Z-direction 62 is represented in FIG. 8 by an encircled dot to denote the orientation of acceleration force 78 as being in the positive direction and oriented out of the page.

When MEMS inertial sensor 152 is subjected to acceleration force 78 in Z-direction 62, acceleration force 78 causes translational motion of first, second, third, and fourth sections 106, 108, 110, 112 of proof mass 92 in Z-direction 62. However, the heavier first and third sections 106, 110 move in anti-phase relative to the lighter second and fourth sections 108, 112. The anti-phase translational motion is again denoted by arrows 80, 82.

More particularly, in response to acceleration force 78, the relatively stiff rotational beam 122 of each of first and second spring systems 102, 104 refrains from pivoting about its associated midpoint 132, 134. However, second and third spring elements 124, 126 flex to yield the anti-phase translational motion 80, 82 of first and third sections 106, 110 relative to second and fourth sections 108, 112 of proof mass 92. In this example, acceleration force 78 is in a positive direction relative to Z-axis 36. Thus, first and third sections 106, 110 will undergo translational motion 80 (represented by an encircled "X") in the opposite direction of acceleration force 78 and second and fourth sections 108, 112 will undergo translational motion 82 (represented by an encircled dot) in the same direction as acceleration force 78.

Embodiments described herein entail microelectromechanical systems (MEMS) inertial sensors in the form of linear accelerometers. An embodiment of an inertial sensor comprises a proof mass spaced apart from a planar surface of a substrate, the proof mass having a first section and a second section, and the first section having a first mass that is greater than a second mass of the second section. The inertial sensor further comprises an anchor coupled to the planar surface of the substrate and a spring system interconnected between the anchor and the first and second sections of the proof mass. The spring system is configured to enable translational motion of the first and second sections of the proof mass in response to linear acceleration forces imposed on the inertial sensor in any of three orthogonal directions.

Another embodiment of an inertial sensor comprises a proof mass spaced apart from a planar surface of a substrate, the proof mass having a first section, a second section, a third section, and a fourth section. The third section diagonally opposes the first section relative to a center point of the proof mass and the fourth section diagonally opposes the second section relative to the center point. Each of the first and third sections has a first mass that is greater than a second mass of each of the second and fourth sections. The inertial sensor further comprises a first anchor coupled to the planar surface of the substrate, a second anchor coupled to the planar surface of the substrate, a first spring system interconnected between the first anchor and the first and second sections of the proof mass, and a second spring system interconnected between the second anchor and the third and fourth sections of the proof mass. The first and second spring systems are configured to enable translational motion of the first, second, third, and fourth sections of the proof mass in response to linear acceleration forces imposed on the inertial sensor in any of three orthogonal directions.

Yet another embodiment of an inertial sensor comprises a proof mass spaced apart from a planar surface of a substrate, the proof mass having a first section and a second section, the first section having a first mass that is greater than a second mass of the second section. The inertial sensor further comprises an anchor coupled to the planar surface of the substrate and a spring system. The spring system comprises a first spring element, a rotational beam having a first beam end and a second beam end, the first spring element interconnecting the anchor and a midpoint of the rotational beam, the midpoint being centered between the first and second beam ends, a second spring element interconnecting the first beam end of the rotational beam and the first section of the proof mass, and a third spring element interconnecting the second beam end of the rotational beam and the second section the proof mass. In response to a first linear acceleration force in a first direction substantially parallel to the planar surface, the spring structure is configured to enable the first and second sections of the proof mass to undergo translational motion in the first direction and in anti-phase relative to one another. In response to a second acceleration force in a second direction substantially parallel to the planar surface and orthogonal to the first direction, the spring structure is configured to enable the first and second sections of the proof mass to undergo the translational motion in the second direction and in-phase relative to one another. In response to a third acceleration force in a third direction normal to the planar surface of the substrate, the spring structure is configured to enable the first and second sections of the proof mass to undergo the translational motion in the third direction and in anti-phase relative to one another.

The MEMS inertial sensor configurations enable the sensing of linear acceleration forces in three orthogonal directions (e.g., X-axis, Y-axis, and Z-axis). Further, the inertial sensor configurations can provide relatively small device size by facilitating the sharing of a single proof mass structure for sensing in all three directions. This relatively small device size is achieved while providing differential sensing with enhanced sensing efficiency. The enhanced sensing efficiency is achieved by the use of a spring structure that enables translational motion of the proof mass in response to acceleration in each of the three orthogonal directions. Further, a translational motion based approach as opposed to prior art rotational or teeter-totter motion based approaches can yield improvements in device performance such as optimization of sense electrode locations for package stress at various temperatures, and enhancing restoring force to substantially limit stiction related malfunctions.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An inertial sensor comprising:
   a proof mass spaced apart from a planar surface of a substrate, said proof mass having a first section and a second section, said first section having a first mass that is greater than a second mass of said second section;

an anchor coupled to said planar surface of said substrate; and a spring system interconnected between said anchor and said first and second sections of said proof mass, said spring system being configured to enable translational motion of said first and second sections of said proof mass in response to linear acceleration forces imposed on said inertial sensor in any of three orthogonal directions.

2. The inertial sensor of claim 1 wherein said spring system comprises:
a first spring element;
a rotational beam having a first beam end and a second beam end, said first spring element interconnecting said anchor and a midpoint of said rotational beam, said midpoint being centered between said first and second beam ends;
a second spring element interconnecting said first beam end of said rotational beam and said first section of said proof mass; and
a third spring element interconnecting said second beam end of said rotational beam and said second section said proof mass.

3. The inertial sensor of claim 2 wherein:
said spring system is oriented substantially parallel to said planar surface of said substrate;
said first, second, and third spring elements are oriented substantially parallel to one another; and
said rotational beam is oriented substantially perpendicular to said first, second, and third spring elements.

4. The inertial sensor of claim 1 wherein:
in response to a first linear acceleration force in a first direction substantially parallel to said planar surface, said spring structure is configured to enable said first and second sections of said proof mass to undergo translational motion in said first direction and in anti-phase relative to one another;
in response to a second acceleration force in a second direction substantially parallel to said planar surface and orthogonal to said first direction, said spring structure is configured to enable said first and second sections of said proof mass to undergo said translational motion in said second direction and in-phase relative to one another; and
in response to a third acceleration force in a third direction normal to said planar surface of said substrate, said spring structure is configured to enable said first and second sections of said proof mass to undergo said translational motion in said third direction and in anti-phase relative to one another.

5. The inertial sensor of claim 1 further comprising:
first fixed electrodes coupled to said substrate proximate said first section of said proof mass;
first movable electrodes coupled to said first section of said proof mass, said first movable electrodes being positioned in alternating arrangement with said first fixed electrodes, said first movable electrodes being movable relative to said first fixed electrodes for detecting a first linear acceleration force in a first direction substantially parallel to said planar surface of said substrate;
second fixed electrodes coupled to said substrate proximate said second section of said proof mass; and
second movable electrodes coupled to said second section of said proof mass, said second movable electrodes being positioned in alternating arrangement with said second fixed electrodes, said second movable electrodes being movable relative to said second fixed electrodes for detecting a second linear acceleration force in a second direction substantially parallel to said planar surface of said substrate and perpendicular to said first direction.

6. The inertial sensor of claim 5 further comprising third fixed electrodes formed on said planar surface of said substrate between said substrate and each of said first and second sections of said proof mass for detecting a third acceleration force in a third direction normal to said planar surface of said substrate.

7. The inertial sensor of claim 1 wherein said proof mass further comprises:
a third section spaced apart from said planar surface of said substrate and diagonally opposing said first section relative to a center point of said proof mass; and
a fourth section spaced apart from said planar surface of said substrate and diagonally opposing said second section relative to said center point of said proof mass.

8. The inertial sensor of claim 7 wherein said third section exhibits said first mass and said fourth section exhibits said second mass.

9. The inertial sensor of claim 7 further comprising a frame member spaced apart from said planar surface of said substrate, said frame member surrounding said proof mass, wherein said first and third sections are directly attached to said frame member and said second and fourth sections are detached from said frame member.

10. The inertial sensor of claim 7 further comprising a rigid beam spaced apart from said planar surface of said substrate and interconnecting said second and fourth sections.

11. The inertial sensor of claim 7 further comprising:
a second anchor coupled to said planar surface of said substrate proximate said center point of said proof mass; and
a second spring system interconnected between said second anchor and said third and fourth sections of said proof mass, said second spring system being configured to enable translational motion of said third and fourth sections of said proof mass in response to acceleration forces imposed on said inertial sensor in any of said three orthogonal directions.

12. An inertial sensor comprising:
a proof mass spaced apart from a planar surface of a substrate, said proof mass having a first section, a second section, a third section, and a fourth section, said third section diagonally opposing said first section relative to a center point of said proof mass, said fourth section diagonally opposing said second section relative to said center point, and each of said first and third sections having a first mass that is greater than a second mass of each of said second and fourth sections;
a first anchor coupled to said planar surface of said substrate;
a second anchor coupled to said planar surface of said substrate;
a first spring system interconnected between said first anchor and said first and second sections of said proof mass; and
a second spring system interconnected between said second anchor and said third and fourth sections of said proof mass, wherein said first and second spring systems are configured to enable translational motion of said first, second, third, and fourth sections of said proof mass in response to linear acceleration forces imposed on said inertial sensor in any of three orthogonal directions.

13. The inertial sensor of claim 12 further comprising a frame member spaced apart from said planar surface of said substrate, said frame member surrounding said proof mass, wherein said first and third sections are directly attached to said frame member and said second and fourth sections are detached from said frame member.

14. The inertial sensor of claim 12 further comprising a rigid beam spaced apart from said planar surface of said substrate and interconnecting said second and fourth sections.

15. The inertial sensor of claim 12 wherein:
in response to a first linear acceleration force in a first direction substantially parallel to said planar surface, said first and second spring structures are configured to enable said first, second, third, and fourth sections of said proof mass to undergo translational motion in said first direction, said first and third sections moving in-phase, said second and fourth sections moving in-phase, and said first and third sections moving in anti-phase relative to second and fourth sections;
in response to a second acceleration force in a second direction substantially parallel to said planar surface and orthogonal to said first direction, said first and second spring structures are configured to enable said first, second, third, and fourth sections of said proof mass to undergo said translational motion in said second direction, and in-phase relative to one another; and
in response to a third acceleration force in a third direction normal to said planar surface of said substrate, said first and second spring structures are configured to enable said first, second, third, and fourth sections of said proof mass to undergo said translational motion in said third direction, said first and third sections moving in-phase, said second and fourth sections moving in-phase, and said first and third sections moving in anti-phase relative to second and fourth sections.

16. The inertial sensor of claim 15 wherein each of said first and second spring systems comprises:
a first spring element;
a rotational beam having a first beam end and a second beam end, said first spring element interconnecting a corresponding one of said first and second anchors and a midpoint of said rotational beam, said midpoint being centered between said first and second beam ends;
a second spring element interconnecting said first beam end of said rotational beam and a corresponding one of said first and third sections of said proof mass; and
a third spring element interconnecting said second beam end of said rotational beam and a corresponding one of said second and fourth sections of said proof mass.

17. The inertial sensor of claim 16 wherein:
said first and second spring systems are oriented substantially parallel to said planar surface of said substrate;
said first, second, and third spring elements are oriented substantially parallel to one another and said first direction of said first linear acceleration force is substantially parallel to a first lengthwise dimension of said first, second, and third spring elements; and
said rotational beam is oriented substantially perpendicular to said first, second, and third spring elements and said second direction of said second linear acceleration force is substantially parallel to a second lengthwise dimension of said rotational beam, wherein:

in response to said first linear acceleration force, said rotational beam pivots about said midpoint and said first, second, and third spring elements flex to yield said anti-phase translational motion in said first direction;
in response to a second linear acceleration force, said rotational beam refrains from pivoting, and said second and third spring elements flex to yield said in-phase translational motion in said second direction; and
in response to said third acceleration force, said rotational beam refrains from pivoting and said first, second, and third spring elements flex to yield said anti-phase translational motion in said third direction.

18. An inertial sensor comprising:
a proof mass spaced apart from a planar surface of a substrate, said proof mass having a first section and a second section, said first section having a first mass that is greater than a second mass of said second section;
an anchor coupled to said planar surface of said substrate; and
a spring system comprising:
a first spring element;
a rotational beam having a first beam end and a second beam end, said first spring element interconnecting said anchor and a midpoint of said rotational beam, said midpoint being centered between said first and second beam ends;
a second spring element interconnecting said first beam end of said rotational beam and said first section of said proof mass; and
a third spring element interconnecting said second beam end of said rotational beam and said second section said proof mass, wherein:
in response to a first linear acceleration force in a first direction substantially parallel to said planar surface, said spring structure is configured to enable said first and second sections of said proof mass to undergo translational motion in said first direction and in anti-phase relative to one another;
in response to a second acceleration force in a second direction substantially parallel to said planar surface and orthogonal to said first direction, said spring structure is configured to enable said first and second sections of said proof mass to undergo said translational motion in said second direction and in-phase relative to one another; and
in response to a third acceleration force in a third direction normal to said planar surface of said substrate, said spring structure is configured to enable said first and second sections of said proof mass to undergo said translational motion in said third direction and in anti-phase relative to one another.

19. The inertial sensor of claim 18 wherein:
said spring system is said oriented substantially parallel to said planar surface of said substrate;
first, second, and third spring elements are oriented substantially parallel to one another and said first direction of said first linear acceleration force is substantially parallel to a first lengthwise dimension of said first, second, and third spring elements; and
said rotational beam is oriented substantially perpendicular to said first, second, and third spring elements and said second direction of said second acceleration force is substantially parallel to a second lengthwise dimension of said rotational beam, wherein:

in response to said first linear acceleration force, said rotational beam pivots about said midpoint and said first, second, and third spring elements flex to yield said anti-phase translational motion in said first direction;

in response to said second linear acceleration force, said rotational beam refrains from pivoting, and said second and third spring elements flex to yield said in-phase translational motion in said second direction; and in response to said third acceleration force normal to said planar surface of said substrate, said rotational beam refrains from pivoting and said first, second, and third spring elements flex to yield said anti-phase translational motion in said third direction.

20. The inertial sensor of claim 19 further comprising:

first fixed electrodes coupled to said substrate proximate said first section of said proof mass;

first movable electrodes coupled to said first said proof mass, said first movable electrodes being positioned in alternating arrangement with said first fixed electrodes, said first movable electrodes being movable relative to said first fixed electrodes for detecting said first linear acceleration force in said first direction;

second fixed electrodes coupled to said substrate proximate said second section of said proof mass;

second movable electrodes coupled to said second section of said proof mass, said second movable electrodes being positioned in alternating arrangement with said second fixed electrodes, said second movable electrodes being movable relative to said second fixed electrodes for detecting said second linear acceleration force in said second direction; and third fixed electrodes formed on said planar surface of said substrate between said substrate and each of said first and second sections of said proof mass for detecting said third acceleration force in said third direction.

* * * * *